Oct. 4, 1949.  E. A. JOHNSON  2,483,417
METHOD AND APPARATUS FOR DETECTING PERMEABLE BODIES
Filed Oct. 23, 1941  6 Sheets-Sheet 1

INVENTOR
E. A. JOHNSON
BY
ATTORNEY

Oct. 4, 1949.  E. A. JOHNSON  2,483,417
METHOD AND APPARATUS FOR DETECTING PERMEABLE BODIES
Filed Oct. 23, 1941  6 Sheets-Sheet 3

INVENTOR
E. A. JOHNSON

Oct. 4, 1949.　　　　　E. A. JOHNSON　　　　　2,483,417
METHOD AND APPARATUS FOR DETECTING PERMEABLE BODIES
Filed Oct. 23, 1941　　　　　　　　　　　　　　6 Sheets-Sheet 4

INVENTOR
E. A. JOHNSON
BY
ATTORNEY

Oct. 4, 1949.   E. A. JOHNSON   2,483,417
METHOD AND APPARATUS FOR DETECTING PERMEABLE BODIES
Filed Oct. 23, 1941   6 Sheets-Sheet 6

Fig. 13.

INVENTOR
E. A. JOHNSON
BY
ATTORNEY

Patented Oct. 4, 1949

2,483,417

UNITED STATES PATENT OFFICE 2,483,417

METHOD AND APPARATUS FOR DETECTING PERMEABLE BODIES

Ellis A. Johnson, Chevy Chase, Md.

Application October 23, 1941, Serial No. 416,205

19 Claims. (Cl. 89—1.5)

(Granted under the act of March 3, 1883, as amended April 30, 1928; 370 O. G. 757)

This invention relates to means for detecting the presence of a submarine submerged beneath the surface of a body of water in which the permeability of the submarine is employed to control the detecting mechanism. More specifically the invention provides an arrangement in which the balance of an alternating magnetic field set up by an attacking vessel is destroyed due to the permeability of a submarine within the vicinity of the vessel thereby causing an unbalanced condition of two opposedly connected detecting coils sufficient to provide a signal indication and automatically release a depth charge or explosive bomb as the vessel passes over the detected submarine.

In devices heretofore proposed for detecting submarines the detecting mechanism is usually of a type in which the presence of the submarine is made manifest through the operation of certain sensing mechanism adapted to respond to sound waves or impulses or by the operation of supersonic detecting devices carried by the detected vessel. Such devices have proved to be not entirely satisfactory under certain conditions of service due to the effects of temperature gradients on the devices and the complication in the operation of the devices when the attacking vessel is moving through the water at a relatively high rate of speed. Further difficulties have been experienced with these devices in service for the additional reason that both the submarine and its wake produce reflections of sufficient magnitude to be detected by the devices and, in certain cases, the presence of a large fish within the vicinity of the device has produced reflections similar to those caused by a submarine.

In the system of the present invention the permeability of a submarine is employed to distort an alternating magnetic field set up by a coil of wire arranged on the attacking vessel whereby the degree of response of one of two opposedly connected detecting coils disposed within the field is varied from the degree of response of the other of the coils sufficiently to cause a recording device to actuate a recording element variably and release a depth charge or explosive bomb during the passage of the vessel over the submarine. Briefly stated, the invention contemplates the provision of new and improved means for detecting distortions in a variable magnetic field caused by the presence of a permeable body such, for example, as a submarine disposed within the field in which a depth charge or explosive bomb is automatically released in such a position that the greatest destructive action of the explosive charge on the submarine may be effected.

It is the present general practice to install large coils of wire on the forward and aft portions of a vessel passing through enemy waters, and to provide means for passing an electric current through the coils for the purpose of neutralizing the magnetic field set up by the vessel as a protection against submarine mines. Such procedure is referred to herein as degaussing, and the coils employed for this purpose as degaussing coils, the forward coil being referred to as the F coil, and the aft coil as the Q coil. In addition to the F and Q coils, a third coil referred to herein as the M coil is employed to neutralize the magnetic field set up by the vessel. These coils may be employed with the system of the present invention or, if desired, additional coils may be provided for use with the system. In the event that the degaussing coils are employed for the detection of a hidden submarine, the M coil is energized with an alternating electric current of relatively low frequency such, for example, as five cycles per second and the F and Q coils are employed for detecting distortions in the magnetic field set up by the M coils due to the presence of a submarine within the field. In the event that no foreign permeable body is disposed within the field set up by the M coils, the electromotive signals received from the F and Q coils are equal and opposite in character by reason of the provision of certain signal compensating devices operatively connected thereto. As the attacking vessel approaches within the vicintiy of a hidden submarine, the permeability of the submarine causes the alternating field of the M coil to be distorted and the response of the detecting coils F and Q to be unequal in character.

The invention is also adapted for use with an aircraft in flight in which a pair of induction coils are provided for detecting the presence of a submarine or other permeable object of sufficient size to cause an appreciable distortion of an alternating field set up by a coil secured to the aircraft, the detecting coils being disposed in spaced relation with each other along the fuselage of the aircraft or, in the case of an airplane, preferably near the opposite ends of the wing. The detecting mechanism may, if desired, be employed to release automatically a depth charge or explosive bomb directly above the detected submarine.

One of the objects of the present invention resides in the provision of new and improved means for detecting the presence of a submarine or other permeable body and indicating when the attacking vessel passes over the body.

Another of the objects is the provision of means carried by a vessel in which the permeability of a hidden submarine is employed to control the automatic release of an explosive charge as the vessel passes over the submarine.

Another of the objects is the provision of new and improved means in which the degaussing coils of a vessel are employed for setting up an alternating magnetic field and detecting a distortion of the field caused by the introduction of a foreign permeable object within the field.

Another object is the provision of means responsive to the permeability of a submerged vessel disposed within an alternating magnetic field for recording a signal indication of the presence of the submerged vessel.

Another of the objects is the provision of a submarine detecting device in which the submarine cannot escape detection by any of the methods of degaussing heretofore devised.

A still further object is the provision of new and improved means for detecting the presence of a submarine or other permeable body from an aircraft in flight regardless of the degaussed condition of the body and for automatically releasing a depth charge as the airplane passes over the detected body.

Still other objects, advantages and improvements will be apparent from the following description of the invention taken in connection with the accompanying drawings of which.

Figure 1:
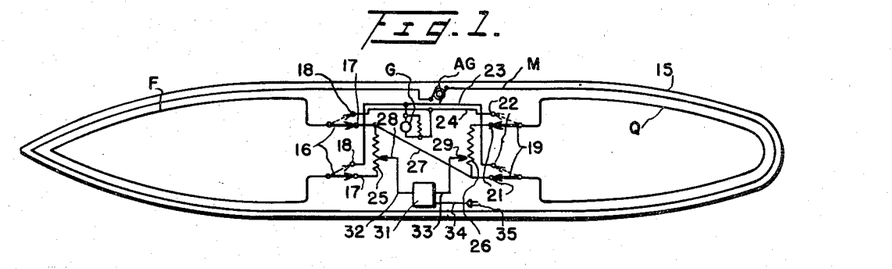
Fig. 1 illustrates diagrammatically an arrangement in which the degaussing coils of a vessel are employed to control a submarine detecting and depth charge releasing mechanism in accordance with the permeability of the submarine.

Referring now to the drawings on which like numerals of reference are employed to designate like parts throughout the several views, and more particularly to Fig. 1 thereof, there is shown thereon a vessel such, for example, as a destroyer or transport indicated generally by the numeral 15 and provided with a degaussing coil F within the forward part of the vessel and a degaussing coil Q within the aft portion of the vessel. A degaussing coil M connected at the ends thereof to the alternating current generator AG is also provided. The coil F is connected at the ends thereof preferably to a switch 16 provided with electrical contacts 17 and 18. In a similar manner the coil Q is connected to the switch 19 provided with electrical contacts 21 and 22. The contacts 18 of switch 16 are in electrical circuit with the contacts 22 of switch 19 by means of the conductors 23 and 24 extending therebetween. The conductors 23 and 24 are also connected to a source of electrical energy such, for example, as the generator G illustrated whereby, when the switches 16 and 19 are in the position indicated in broken outline, the coils F and Q are in an energized condition and are employed as degaussing coils.

When the degaussing coils are to be employed for submarine detection, switches 16 and 19 are moved to the position indicated in solid outline thereby connecting the resistance elements 25 and 26 across the coils F and Q respectively, and disconnecting coils F and Q from the conductors 23 and 24 extending to the generator G. The resistance units 25 and 26 are connected together by the conductor 27 in the manner illustrated, Fig. 2, and are provided with settable contact elements 28 and 29 connected as by the conductors 32 and 33 with a recording amplifying device 31 comprising a low frequency amplifier tuned to the frequency of the generator AG and having a recording milliammeter connected thereto. The recording milliammeter is provided with an electric cord or cable 34 comprising a plurality of electrical conductors in circuit with the terminals of the plug 35 adapted to be inserted into a socket connected to a source of electrical power.

Figure 2:
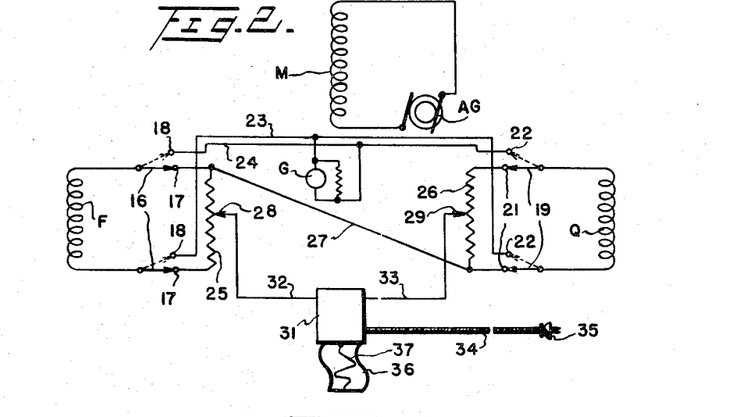
Fig. 2 illustrates diagrammatically the electrical circuit arrangement of Fig. 1.

The settable contacts 28 and 29 are adjusted to positions such that the instantaneous electromotive force of the signal outputs or fractional signal portions thus selected from signals generated by each of the coils F and Q in response to linkages of the coils with the alternating electromagnetic field set up by the coil M are equal and opposite in character and thus a negligible amount of current flows through the conductors 27, 32, and 33 when there is no submarine or other permeable object other than the attacking ship within the magnetic field set up by the coil M notwithstanding the existence of a difference in the flux linkages of coils F and Q with the undistorted field of coil M. The recorder 31 thus produces a substantially straight trace upon the moving chart 36 when the alternating field set up by the coil M is undistorted by the presence of a hidden submarine or other foreign permeable object whereas, when the vessel passes over a submarine, a trace such as illustrated at 37 is produced on the moving chart, as will more clearly appear as the description proceeds.

Figure 3:
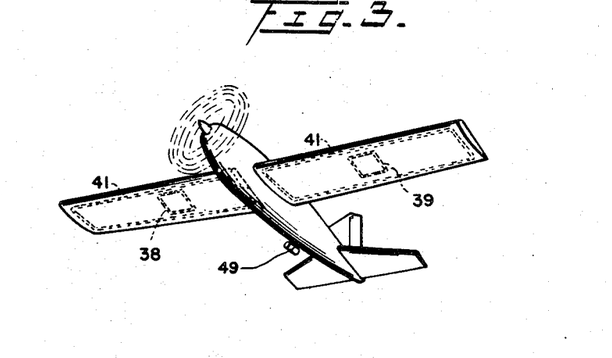
Fig. 3 is a view in perspective of an aircraft in flight employing the system of the present invention.

Referring now to Fig. 3, there is shown thereon an airplane in flight having a pair of detecting coils 38 and 39 disposed preferably within or on the wing of the airplane, and adapted to produce substantially identical signals of opposite character in response to the alternating field set up by the coil 41 when the alternating field is undistorted by the presence of an extraneous body of permeable material.

Figure 4:
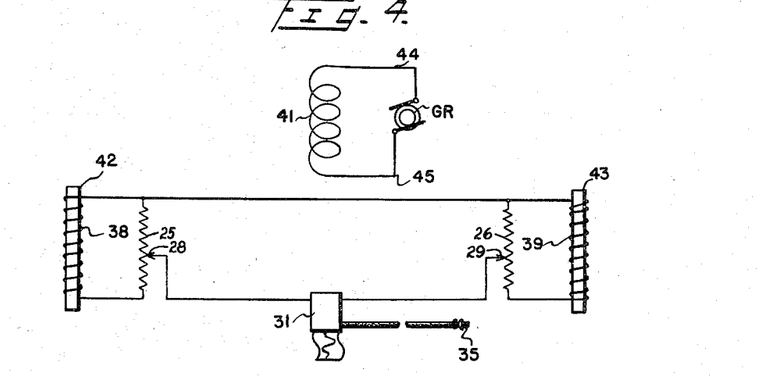
Fig. 4 illustrates diagrammatically an alternative electrical circuit arrangement suitable for use with the aircraft of Fig. 3.

As illustrated on Fig. 4, the coils 38 and 39 are connected in series with a pair of signal compensating devices 25 and 26 respectively such that equal and opposite signal outputs or fractional signal portions of the coils may be selected in the undistorted field of coil 41 by adjustment of contacts 28 and 29 similarly to the arrangement of Fig. 2, the circuit being continued through an indicating or recording device 31 suitable for the purpose such, for example, as a microammeter or recording device illustrated. In the event that the recording device is employed as an indicating control mechanism, it will of course be understood that the plug 35 connected thereto is in circuit connection with a source of electrical power and, if desired, the system of Fig. 13 may be employed to release a depth charge 49 automatically as the airplane passes over the detected submarine. Each of the coils 38 and 39 may, if desired, be provided with a magnetic bar or rod as illustrated at 42 and 43 respectively, Fig. 4, of permeable material such, for example, as a material known in the trade as permalloy, having a composition substantially of 12½ per cent iron and 87½ per cent nickel thereby to increase the number of flux linkages of the coils. The magnetic rods 42 and 43 are disposed in alinement with the axes of the coils 38 and 39 respectively, and parallel to each other and to the axis of each of the coils. It will be understood that, if desired, the coils 38 and 39 may be arranged with their axes and magnetic rods 42 and 43 in alinement with each other and perpendicular to the axis of the coil 41. As illustrated on Fig. 4, coil 41 is connected by the conductors 44 and 45 to a source of alternating current such as the alternating generator GR.

As illustrated on Fig. 3 the induction coils 38 and 39 are disposed preferably within the wing of an airplane and adapted to generate variable voltages in accordance with the variations of the flux linkages of the coils with the magnetic field set up by the coil 41. The instantaneous voltage set up by each of the coils differs from the instantaneous voltage of the other of the coils in accordance with the degree of distortion of the magnetic field caused by the presence of a foreign permeable object within the field. The sensitivity of the detecting device, it will be understood, will in general be proportional to the degree of separation of the coils 38 and 39.

Figure 5:
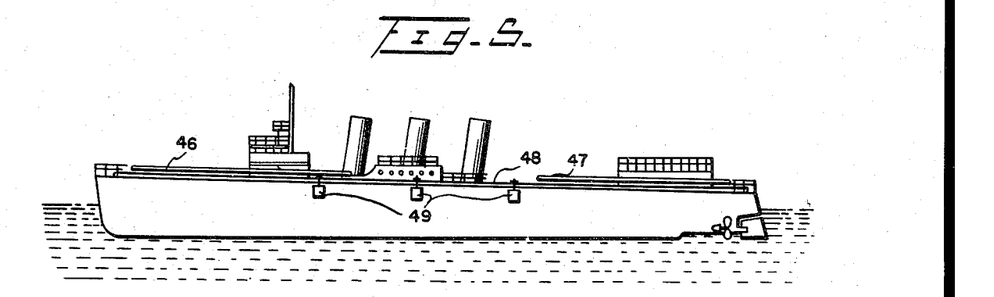
Fig. 5 is a view in elevation of a vessel employing the submarine detecting device of the present invention.

On Fig. 5 is illustrated a vessel having a search coil 46 on the forward deck and a search coil 47 on the aft deck of the vessel, each of the coils 46 and 47 being connected together in the manner of Fig. 2 or Fig. 4, as the case may be, and adapted to control an indicating device for registering the location of a submarine, the arrangement preferably including means for automatically releasing a depth charge or explosive bomb as the vessel passes over or within close proximity to the detected submarine. There is also shown on Fig. 5 a coil 48 disposed about the deck of the vessel, the coil being in electrical circuit with a source of alternating current of relatively low frequency whereby a low frequency alternating magnetic field of balanced proportions is set up by the coil 48 when no extraneous permeable body is present within the field of the coil. The presence of a submarine within the vicinity of a vessel causes the field set up by the coil 48 to be distorted whereby the signals generated by the coils 46 and 47 respectively are unequal in character and a signal is thus generated by the combined action of the coils 46 and 47 sufficient to actuate a recording device and selectively release the depth charges indicated generally at 49 as the vessel passes over the submarine.

Figure 6:
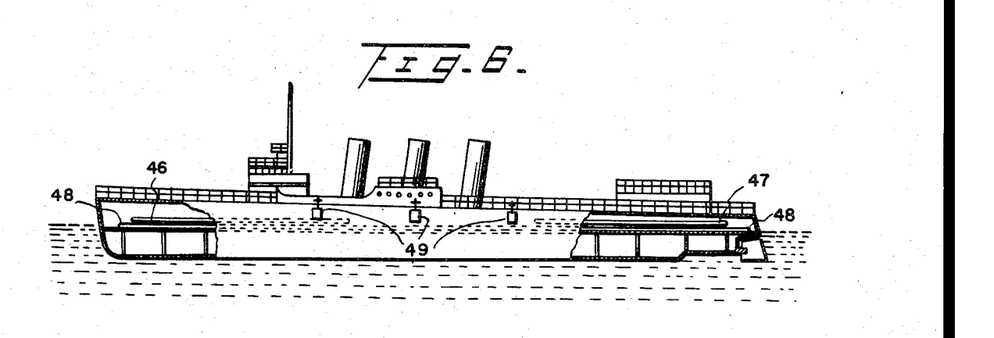
Fig. 6 is a view in elevation, partially broken away, showing an alternative arrangement in which the effects of pitch and roll of the vessel are reduced.

On Fig. 6 is shown a vessel in which the coils 46, 47, and 48 are disposed within the vessel preferably near the water line or metacenter of the vessel, the coils 46 and 47 being disposed at opposite ends of the vessel. This disposition of the field generating and search coils provides an arrangement in which the roll and pitch of the vessel produces less distributing effects than the arrangement of Fig. 5 and for this reason a higher degree of sensitivity of the detecting mechanism may be employed.

Figure 7:
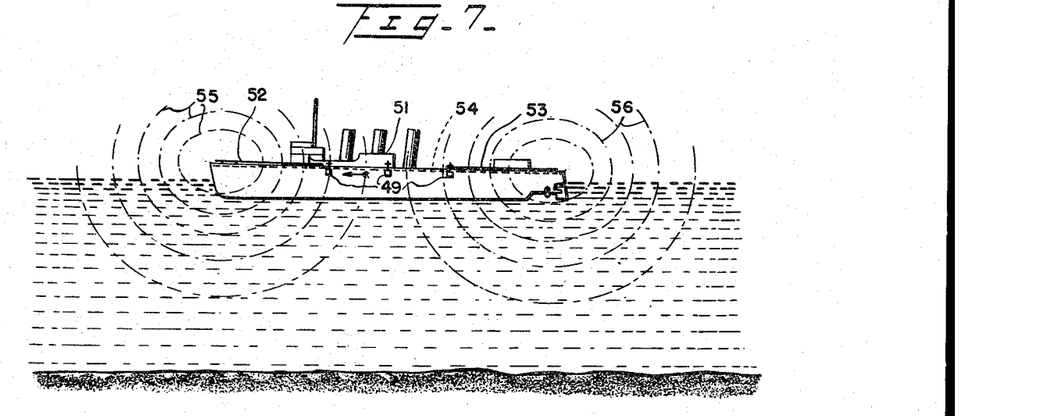
Fig. 7 is a view in elevation of a vessel illustrating diagrammatically the flux linkages of the detecting coils when an alternating magnetic field is undistorted by a foreign permeable body.

On Fig. 7 is shown a vessel indicated generally by the numeral 51 having a pair of search coils 52 and 53 disposed with axes vertical near the ends of the vessel and adapted to respond to changes of the magnetic field within the coils set up by the coil 54 disposed about the vessel through which is flowing an alternating current of relatively low frequency. The coils 52 and 53 are connected together in series opposition such, for example, as illustrated in Fig. 2, the circuit including the recording and release control mechanism 31. With no extraneous permeable body within the field of the coil 54' the instantaneous voltages of the signal outputs or fractional signal portions generated by the coils 52 and 53 are equal and opposite in character by reason of the setting of the adjustable devices 28 and 29, Fig. 2, whereby a substantially straight line is traced by the recording device 31 upon the moving chart 36. The magnetic field set up by the coil 54 at the forward end of the vessel is indicated generally by the dashed lines 55 and the magnetic field set up by the coil 54 at the aft end of the vessel is indicated generally by the dashed lines 56, the field represented for the purpose of illustration by the numerals 55 and 56 being generally symmetrical in character when no extraneous permeable body is included within the field.

Figure 8:
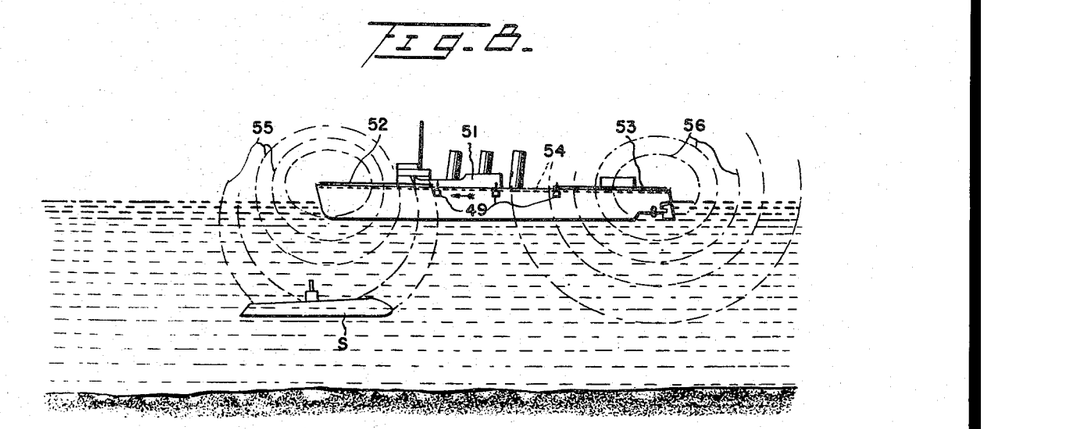
Figs. 8 and 9 are views in elevation of a vessel in which are illustrated variations in the flux linkages of the detecting coils caused by the distortion of an alternating magnetic field due to the presence of a submarine within the field.

On Fig. 8 is illustrated in diagrammatic form the effect of a permeable body such, for example, as the submarine S illustrated, upon the field set up by the coil 54 as the vessel approaches the hidden submarine. The magnetic field 55, it will be noted, is distorted by reason of the permeable nature of the submarine regardless of the degree of magnetization of the submarine or the absence of such magnetization. As illustrated on Fig. 8 the presence of the submarine within the magnetic field 55 increases the permeability of a fractional portion of the field set up by the coil 54 whereby the magnetic field 55 is distorted and the flux linkages of the coil 52 are different in number from the flux linkages of the coil 53 by reason of the distortion of the field 55 caused by the submarine. A signal indication is thus given of the presence of a submarine within the vicinity of the vessel, the signal increasing in strength as the vessel continues to approach the hidden submarine.

Figure 9:
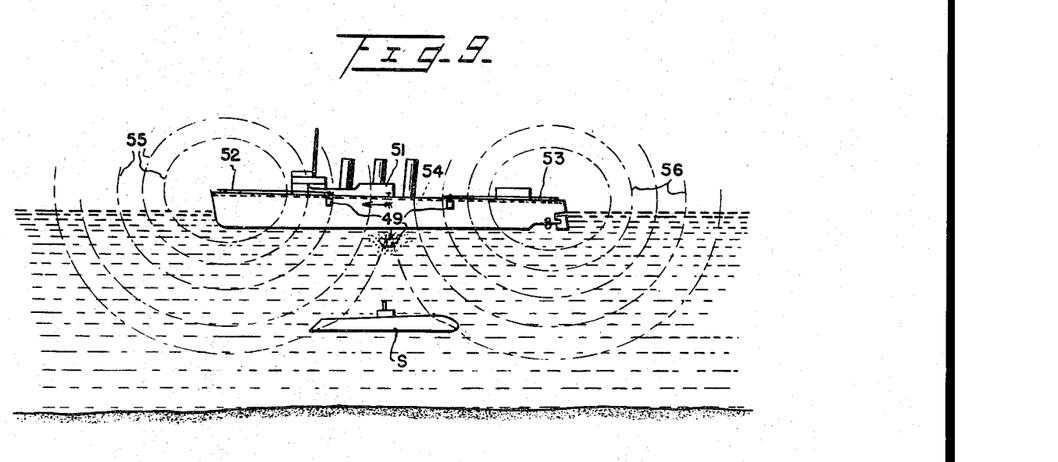

On Fig. 9 is illustrated the distortional effect of the submarine S on the fields 55 and 56 when the vessel 51 is directly above the submarine. When the vessel is in this position, the number of flux linkages of each of the coils 52 and 53 is the same and the controlling mechanism operates to cause the depth charge 49 to be released above the detected submarine. As the ship passes beyond the submarine the flux linkages of the coil 53 are changed in the manner of the coil 52 during the approach of the vessel within the vicinity of the submarine.

It will be noted that the coils 52 and 53 are in such electrical connection that the recording milliammeter indicates the difference between the flux linkages of the two coils. Thus, when the field of the coil 54 is caused to move past the submarine into the position illustrated on Fig. 9, the coils 52 and 53 have each received an equal total number of flux linkages and the recording element of the milliammeter will be moved to the null or zero position illustrated on the curve 50 at point 60 thereof. The points 57 and 58 of the curve 50 indicate the position of the attacking vessel with respect to the submarine when the difference in the flux linkages of the coils 52 and 53 respectively is a maximum. The recording milliammeter 31, it will be noted, as employed in the system of the present invention responds variably in accordance with the difference between the number of flux linkages occurring in the coils 52 and 53.

Figure 10:
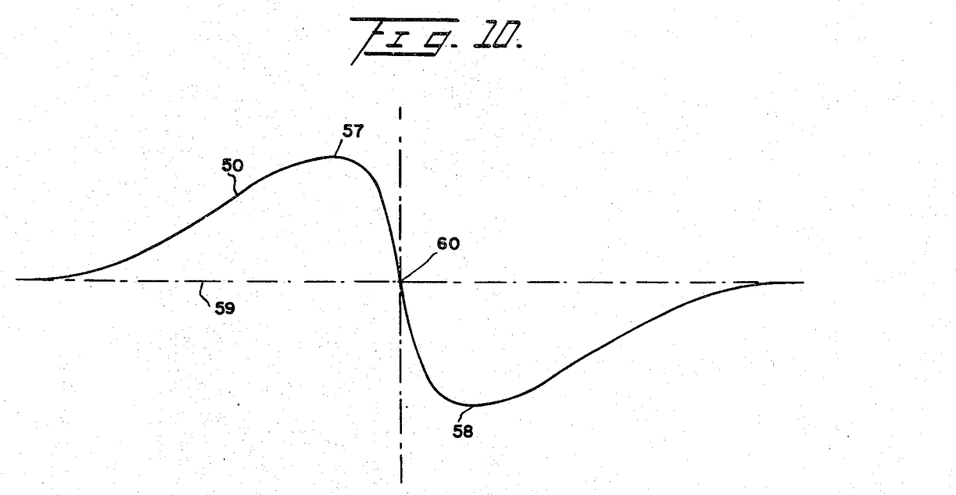
Fig. 10 illustrates graphically the signal recorded by the recording device as the vessel passes over the submarine.

The trace of the signal received from the coils 52 and 53 is illustrated on Fig. 10 by the curve 50 thereof, in which the dashed line 59 is employed to designate the null position of the actuating element of the recording milliammeter 31 when there is no submarine or other extraneous body of permeable material within the vicinity of the vessel 51. For purposes of illustration, the vessel of Fig. 9 is illustrated above the curve 50 thereby to indicate generally the position of the vessel relative to the submarine when the signal represented by the curve 50 passes through the null point opposite the hidden submarine. When this occurs a depth charge 49 is released selectively at a predetermined point with respect to the vessel 51 whereby the maximum destructive effect of the depth charge upon the submarine is accomplished.

The manner in which the distortion of the alternating field set up by the coil 54 in response to the relative movement of a permeable body such, for example, as a submarine with respect to the alternating field is employed to record the signal and cause the control mechanism selectively to release a depth charge above the permeable body will now be described.

Figure 11:
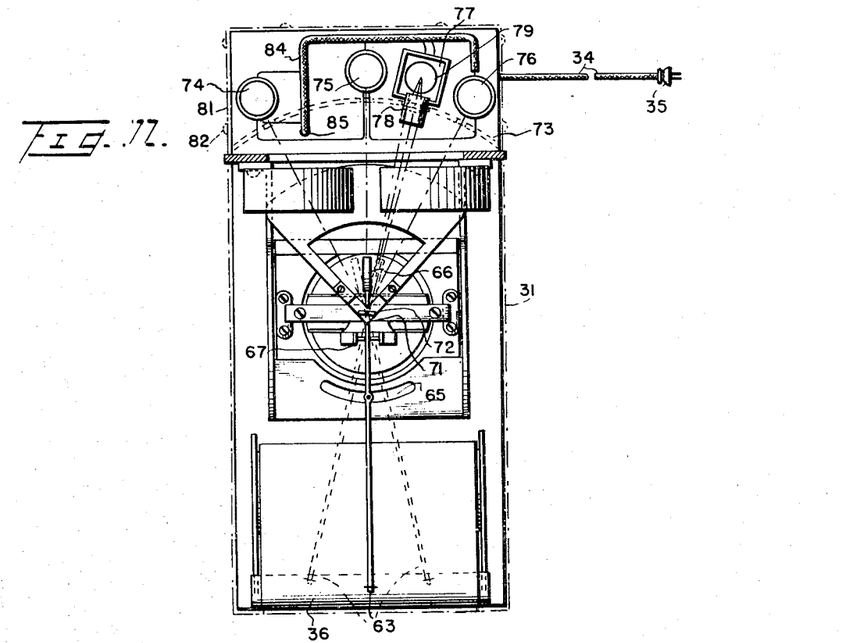
Fig. 11 is a plan view, partially in section, of a recording mechanism suitable for use with the present invention.
Figure 12:
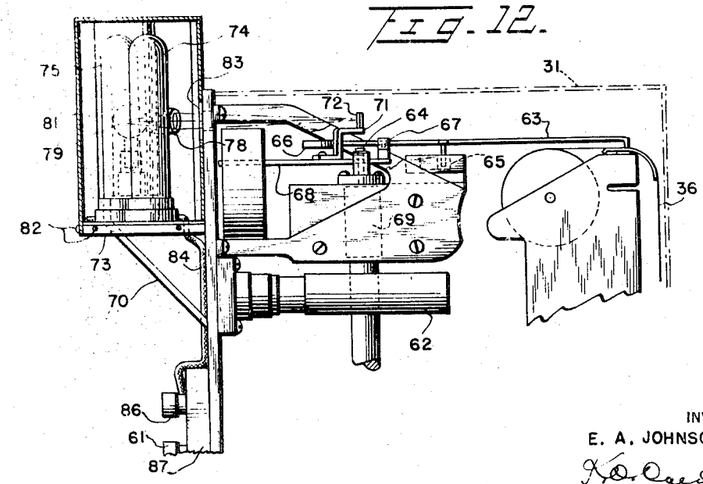
Fig. 12 is a view in elevation, partially in section and partially broken away of the device of Fig. 11.

On Figs. 11 and 12 is shown in plan and elevation respectively a recording milliammeter 31 suitable for use with the system of the present invention such, for example, as the photoelectric recorder shown in catalog 32C144 of the General Electric Company, and provided with terminals such as shown at 61 for establishing an electrical connection between the search coils and the instrument. The recording instrument is also provided with means such as an electrical cord and plug 35 for establishing a circuit connection with a source of electrical power. The instrument is provided with means including a pair of photoelectric tubes 62 controlled by an optical system for causing an inking pen to be moved angularly to different positions in accordance with variations of current received from the search coils 52 and 53. Movement of the pen 63 about the pivot support 64 causes ink from the well 65 to be drawn into the pen and transferred to the moving chart 36 thereby to record in graphic form the movements of the pen. A counterweight 66 is provided preferably on the pen member 63 whereby the weight of the pen and the friction of the pen against the moving chart is reduced. The pen is pivoted at 67 for rotation in a vertical plane, the pivot 67 being secured to a member 68 rotatable in a horizontal plane and controlled by the coil 69 in accordance with the action of the photoelectric tubes 62. Secured to the member 68 as by the support 71 is a mirror 72 having the plane of reflection thereof coincident with the vertical axis of rotation of the pen member 63.

Attached to the rear of the instrument in any suitable manner is the shelf member 73 held in braced position thereto as by the support 70. Mounted upon the shelf are the photoelectric tubes 76, 74, and 75 arranged arcuately with respect to the mirror 72. A projector 77 comprising a lens 78 is also mounted on the shelf whereby the rays of light from an electric bulb 79 within the projector are focused upon the mirror 72 and directed against the photoelectric cell 75 with the pen in the null position. As the pen is moved by the actuating coil 69 to either of the positions indicated in dashed lines on Fig. 11, the rays of light from the projector are reflected by the mirror 72 upon the photoelectric tube 74 or 76, as the case may be, thereby causing the photoelectric tube to pass current from a source of electric power to certain control mechanism, as will more clearly appear as the description proceeds. The photoelectric tube and projector are preferably enclosed within a casing 81 secured to the shelf as by the screws 82, thereby to exclude light from the photoelectric tubes, except as reflected by the mirror 72 through an aperture 83 within the rear of the instrument. Circuit connections to the photoelectric tubes and the projector are established by means of conductors within an electric cable 84 passing preferably through an aperture 85 within the shelf 73 and terminating on a plurality of electrical connectors 86 mounted upon a connecting block 87 secured in any suitable manner to the rear of the instrument.

Figure 13:
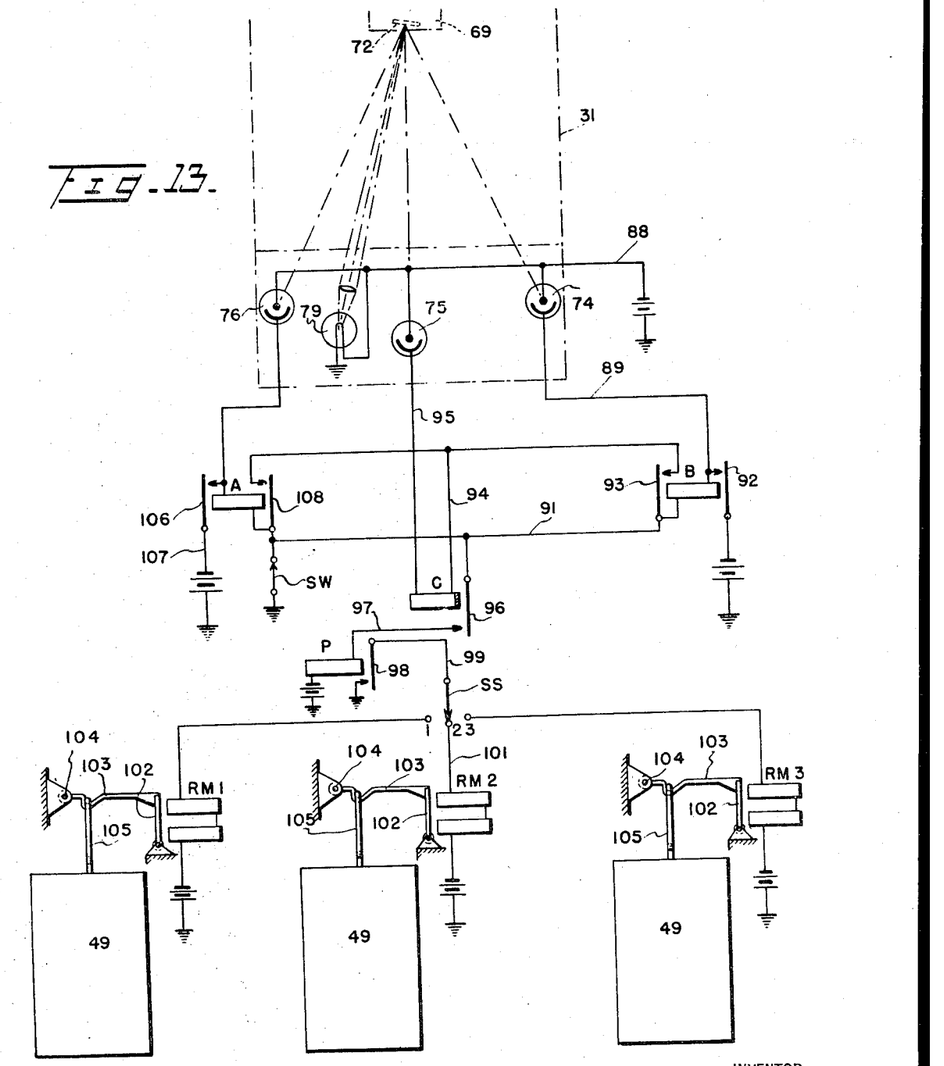
Fig. 13 illustrates diagrammatically an electrical circuit arrangement suitable for use with the present invention for controlling the depth charge releasing mechanism.

The manner in which the automatic release of a selected depth charge is accomplished in response to signals received from the detecting mechanism as the attacking vessel passes over the permeable center of a hidden submarine will best be understood by reference to Fig. 13 on which is shown in diagrammatic form the circuits and mechanism for controlling the release of a selected depth charge. The numeral 31 is employed to designate a recording device in electrical connection with a pair of coils of wire such, for example, as the search coils 52 and 53 or the degaussing coils F and Q of Figs. 1 and 2 adapted to respond to the changing magnetic field set up by the coil 54 or M, as the case may be, and control the recording element in accordance with the degree of distortion of the alternating field caused by the presence of a foreign permeable object within the field. The recording device 31 is provided, as heretofore stated, with a mirror 72 adapted to reflect the rays of light from the electric bulb 79 to the photoelectric tubes 74, 75, and 76 in accordance with the instant position of the recorder element. The photoelectric tubes 76 and 74 are in electrical circuit with the windings of relays A and B respectively, and the photoelectric tube 75 is in circuit with the winding of relay C. The relays A, B, and C, are adapted to be operated by a source of electrical energy when the associated photoelectric tubes are actuated by light rays emanating from the electric bulb 79. A switch SW is provided for releasing at will any of the relays A, B, and C. A power relay P is also provided in electrical circuit with a contact of relay C such that the operation of relay C causes relay P to operate and apply a control potential through a selector switch SS whereby a release mechanism is caused to operate selectively in accordance with the setting of the selector switch SS and thus release a selected depth charge 49. In the illustrative embodiment of the invention shown on Fig. 13, three depth charges 49 are supported by a latch mechanism comprising the release magnets RM1, RM2, and RM3 disposed preferably at different portions of the vessel such, for example, as the forward, center, and aft portions and connected to the contacts 1, 2, and 3, respectively of switch SS. The switch SS is employed to control the circuit connection to a predetermined release magnet whereby a depth charge may be released selectively from different portions of the ship in accordance with the setting of the switch SS. Thus, means are provided for automatically releasing a depth charge at different points along the attacking vessel in accordance with the rate of travel of the vessel through the water, whereby compensation is made for errors produced by the speed of the vessel at the moment of attack and the explosion of the depth charge substantially within the vertical plane of the submarine is effected. Whereas in the illustrative embodiment of the invention shown on Fig. 13, means are provided for selectively releasing three explosive charges, it will be understood that the number of explosive charges to be selectively released may be increased or decreased without departing from the spirit or scope of the invention, it being necessary to provide a selection switch SS having the appropriate number of selecting positions in operative connection with the depth charge releasing mechanism.

The operation of the system of Fig. 13 will now be described:

Let it be assumed by way of example, that the vessel 51, Figs. 7, 8, and 9, is provided with a transmitting coil 54 in electrical connection with a source of low frequency alternating current and having a pair of search coils 52 and 53 disposed within the forward and aft portions of the vessel respectively and in operative electrical connection with the recording control mechanism 31. Let it also be assumed that the rate of travel of the vessel through the water corresponds generally to the set position 2 of switch SS illustrated on Fig. 13 and that an explosive depth charge 49 has been placed in a position to be released by each of the release magnets RM1, RM2, and RM3.

The coils 52 and 53 are connected to signal compensating devices 25 and 26 respectively, Fig. 2, whereby the instantaneous electromotive force applied to the recording device 31 by each of the coils 52 and 53 in response to the alternating field set up by the coil 54 is equal and opposite in character when no extraneous permeable body is disposed within the field set up by the coil 54. The movable pen member of the recording device remains in the null or center position during this time thereby causing a substantially straight line trace to be made upon the moving chart 36.

As the field set up by the coil 54 is moved sufficiently to include the submarine S within the field, that portion of the field indicated by the lines 55 is distorted due to the decrease in the reluctance of the magnetic path of the field by the presence of the submarine thereby causing the number of flux linkages of the coil 52 with the field set up by the coil 54 to be somewhat greater than the flux linkages of the coil 53. As the vessel continues to approach the hidden submarine the number of flux linkages of the coil 52 is increased until the point 57 of the curve 50, Fig. 10, is reached at which time the portion of the field of the coil 54 included within the coil 52 is distorted by the submarine such that the flux linkages of the field with the coil 52 are a maximum. As the vessel continues to move onward, the flux linkages of the coil 52 are decreased until the vessel is directly above the hidden submarine at which time the effective flux linkages of the coils 52 and 53 are the same. This point is indicated at 60 on the curve 50 by movement of the pen into the null position thereof. As the vessel continues its onward movement, that portion of the field of the coil 54 embraced by the coil 53 is distorted by the submarine until point 58 of the curve 50 is reached at which point the flux linkages of the coil 53 are at a maximum. The flux linkages are thereafter decreased as the vessel moves beyond the submarine until the pen has again returned to the null position.

As the submarine is first detected by the coil 52 the recording element and mirror 72 begin to rotate away from the null position thereby causing the reflected light of the electric bulb 79 to be moved towards the photoelectric tube 74. Continued movement of the vessel toward the submarine causes the recording pen to be rotated about the pivot support 64 until the point 57 of the curve 50 is reached thereby causing the mirror to be rotated through an angle sufficient to reflect the rays of light from the bulb 79 upon the photoelectric tube 74 and activate the photoelectric tube. A circuit is now closed from battery by way of conductor 88, photoelectric tube 74, conductor 89, winding of relay B, conductor 91, contacts of switch SW and thence to ground thereby causing relay B to operate and lock by way of its make contact and armature 92 to battery. The operation of relay B at its armature 93 closes a circuit from ground at switch SW, conductor 91, armature 93 and make contact of relay B, conductor 94 and thence to one end of the winding of relay C. As that portion of the ship corresponding to point 57 of the curve 50 passes the submarine, the current through the control element of the recording instrument is reversed, thereby causing the recording element to rotate in a reverse direction toward the null position. As the light beam is moved away from the photoelectric tube 74, the photoelectric tube becomes non-conductive, as is well known in the art, and battery on conductor 88 is removed from the operate circuit of relay B, but relay B does not release at this time by reason of the battery applied thereto at armature 92 and make contact of relay B.

As the recording element moves into the null position indicated at 60 on Fig. 10, light from the electric bulb 79 is reflected by the mirror 72 into engagement with the photoelectric tube 75 thereby causing battery at conductor 88 to be applied by way of photoelectric tube 75 and conductor 95 to the winding of relay C from whence the circuit is continued by way of conductor 94 make contact and armature at 93 of relay B, conductor 91 and contact of switch SW to ground, thereby causing slow releasing relay C to operate. The operation of relay C closes a circuit from ground at switch SW, conductor 91, armature 96 and make contact of relay C, conductor 97, winding of relay P, and thence to battery thereby causing relay P to operate. As armature 98 of relay P engages its make contact, ground is applied to the conductor 99, switch SS and contact 2 thereof, conductor 101, winding of release magnet RM2 and thence to battery thereby causing the release magnet RM2 to operate and move the latch 102 out of locking engagement with the pivoted support 103. The support 103 is caused to rotate about the pivot support 104 and thus release the depth charge 49 suspended therefrom as by the loop or U shaped member 105. The pivot 104, it will be noted, is attached to the vessel at any suitable location whereby the depth charge 49 is dropped into the water at a position with respect to the vessel such that the depth charge will descend within the water substantially in the vertical plane of the detected submarine.

The switch SS is arranged to be set at will to different positions in accordance with the rate of travel of the vessel or, if desired, the setting of the switch SS may be controlled automatically by means suitable for the purpose such, for example, as a governor controlled by the speed of the propulsion mechanism of the vessel or by the ship's log. Relays A, B, and C are sensitive relays adapted to be controlled by the photoelectric cells 76, 74, and 75, respectively. Whereas, in the illustrative embodiment of the invention shown on Fig. 13, the relays A, B, and C are connected directly to the photoelectric cells, it will, of course be understood that suitable signal amplifying means such as a vacuum tube amplifier may be employed, if desired, intermediate the photoelectric cells and the relays without departing from the spirit and scope of the invention herein disclosed. The relay P, it will be noted, is a power relay adapted to control the relatively large current required for the positive operation of the depth charge release magnets.

As the vessel continues its movement past the hidden submarine, the recording element and mirror 72 continue to rotate until the point 58 on the curve 50 is reached thereby activating the photoelectric cell 76 and causing the operation of relay A. As the beam of light moves away from the photoelectric cell 75, the operate circuit to relay C is interrupted and relay C releases. Relay C, it will be noted, is a slow-to-release relay, and for this reason does not interrupt the operate circuit to relay P until sufficient time has elapsed to cause the selected release magnet to operate and release the selected depth charge.

As armature 106 of relay A moves into engagement with its make contact, battery on conductor 107 is applied to the winding of relay A thereby preventing relay A from releasing as the recording element and mirror again move back to the null position. The operation of relay A at armature 108 thereof is without effect at this time for the reason that armature 93 of relay B is in engagement with its make contact. As the recording element again moves into the null position, relays C and P are caused to operate by activation of the photoelectric cell 75.

After the selected depth charge has been released, switch SW is moved momentarily to open position, thereby releasing relays A, B, C, and P. The release of relay P at armature 98 thereof removes ground from conductor 101, thereby restoring the release magnet RM2 to an unoperated condition whereby another depth charge 49 may be suspended from the member 103.

While in the example assumed the depth charge was released from an attacking vessel, it will be understood that, if desired, the depth charge may be released from an aircraft in flight such, for example, as the aircraft illustrated on Fig. 3. Furthermore, when released from an aircraft, the depth charge or explosive bomb may, if desired, be provided with a parachute or means such as fins secured to the casing within which the explosive is contained for directing the depth charge or explosive bomb along a predetermined line of flight without departing from the principles and scope of the invention herein disclosed.

When employed with an aircraft, the system of Fig. 13 using but a single release magnet such, for example, as the release magnet RM2, is satisfactory for the purpose and, if desired, the selector switch SS may be omitted and the armature 98 of relay P connected directly to the winding of the release magnet RM2. Furthermore, while in the illustrative embodiment of the invention of Fig. 13, photoelectric cells are employed for controlling the operation of relays A, B, and C, it will be understood that other instrumentalities such, for example, as photronic cells may, if desired, be employed instead of the photoelectric cells illustrated, in which case no source of electrical energy is required for the operation of the sensitive relays A, B, and C.

Briefly stated in summary, the present invention contemplates the provision of new and improved mechanism for detecting and locating a hidden submarine from a vessel under way, or an aircraft in flight, wherein the permeability of the submarine is employed to control the detecting mechanism. Furthermore, the system of the present invention includes means for recording the signals received when a submarine is detected and means for automatically releasing a depth charge or explosive bomb selectively from an attacking craft such that the explosion of the charge occurs substantially within the vertical plane of the submarine and in proximate relation thereto. When employed with an attacking vessel the present invention provides means for detecting the presence of a hidden submarine in which the effects of roll and pitch of the vessel are greatly reduced.

While the invention has been described with reference to certain preferred examples thereof which give satisfactory results, it will be understood by those skilled in the art to which the invention pertains, after understanding the invention, that various changes and modifications may be made without departing from the spirit and scope of the invention, and it is my intention, therefore, to cover in the appended claims all such changes and modifications.

The invention herein described may be manufactured and used by or for the Government of the United States of America for governmental purposes without the payment of any royalties thereon or therefor.

What is claimed as new and desired to be secured by Letters Patent of the United States is:

I claim:

1. In a system of the character disclosed for detecting a submarine from a vessel in motion, means for setting up an alternating magnetic field about said vessel, gradient means including a pair of oppositely connected signal generating coils disposed in spaced relation on the vessel and linked by said alternating magnetic field, an electro-responsive device operatively connected to said coils and having an element adapted to be actuated variably in either direction in response to the signals generated by the coils in accordance with the difference in the flux linkages of each of the coils with said alternating magnetic field as the magnetic field is distorted by a submarine within the vicinity of the vessel, said gradient means also including means for preventing actuation of said element notwithstanding a difference in the flux linkages of each of the coils with said field in an undistorted condition thereof, said preventing means being effective to reduce to zero a signal generated by the coils when the field is in said undistorted condition, and means controlled by said element for recording the degree of distortion of said magnetic field.

2. In a system of the character disclosed for detecting a submarine from a vessel in motion, means for setting up an alternating magnetic field about said vessel, a pair of oppositely connected degaussing coils linked by said alternating magnetic field and disposed in predetermined spaced relation on said vessel for generating signals of different strength in accordance with the difference in the number of flux linkages of the coils with said alternating magnetic field as the field is distorted by movement of the vessel within the vicinity of a submarine, means settable at will for continuously balancing predetermined fractional portions of the signals generated by each of the coils when no permeable body other than the vessel is disposed within said alternating field, an electro-responsive device operatively connected to said coils and to said balancing means and having an element adapted to be operated variably in accordance with the degree of unbalance of said signal portions, and means controlled by said element for recording the passage of a predetermined portion of said vessel over the detected submarine.

3. In a system of the character disclosed for detecting a submarine from a vessel in motion, means including an induction coil for setting up an alternating magnetic field about the vessel, a pair of degaussing coils disposed in predetermined spaced relation on said vessel and linked by said alternating magnetic field, means including an electrical circuit for causing said degaussing coils to generate signals of variable strength in accordance with the difference in the instantaneous intensity of the alternating field within each of the coils, said circuit including means for balancing fractional signal portions respectively generated by linkage of said degaussing coils with said field in an undistorted condition thereof, an electro-responsive device operatively connected to said electrical circuit and having an element adapted to be operated variably in response to the degree of unbalance of said fractional signal portions, and means controlled by said electro-responsive device for registering the instant of passage of a predetermined portion of said vessel over the submarine.

4. In a system of the character disclosed for detecting a submarine from a vessel in motion, means for setting up an alternating magnetic field about said vessel, means linked by and responsive to said alternating magnetic field for generating an electrical signal in accordance with the degree of distortion of said alternating magnetic field as the vessel moves within the vicinity of a submarine, said signal generating means including means for reducing to zero a signal generated thereby in response to linkage with said field in an undistorted condition thereof without changing the linkage of the generating means therewith, signal receiving means, and means controlled by said signal receiving means for releasing an explosive depth charge as the vessel passes over the submarine.

5. In a system of the character disclosed for detecting a submarine from a vessel in motion, means for setting up an alternating magnetic field about the vessel, means linked by and responsive to the gradient of said alternating magnetic field for generating an electric signal as said alternating magnetic field is distorted by a submarine disposed adjacent the path of travel of the vessel, said signal generating means including means for reducing to zero a signal generated thereby in response to a gradient of said field in an undistorted condition thereof without changing the linkage of the generating means therewith, and means controlled by said signal for releasing an explosive depth charge as the vessel passes over the submarine.

6. In a system of the character disclosed for detecting a submarine from a vessel in motion, means for generating an alternating magnetic field about said vessel, means including a pair of search coils linked by and responsive to the degree of distortion of said alternating magnetic field for generating a signal as the vessel moves into a predetermined position above the submarine, said signal generating means also including means for reducing to zero a signal generated thereby in response to a difference in the linkages of each of said coils with said field in an undistorted condition thereof without changing the signals generated by linkage of the coils therewith, means for releasably supporting an explosive depth charge on the vessel, and means including an electro-responsive device controlled by said signal for causing said explosive depth charge to be released as the vessel moves into said predetermined position.

7. In a system of the character disclosed for detecting a submarine, means including an induction coil disposed on an attacking vessel for generating an alternating magnetic field about the vessel, means including a pair of oppositely connected search coils linked by and responsive to said alternating magnetic field for generating signals of varying strength in accordance with the degree of distortion of said alternating field as the vessel moves within the vicinity of the submarine, means including an electro-responsive device having a movable element adapted to be set to different positions in accordance with the degree of strength of signals generated by said search coils, a plurality of control relays, means controlled by said movable element for operating said control relays in a predetermined sequential order in response to a predetermined movement of the element as the vessel moves to a position above the detected submarine, and means controlled by said control relays during operation in said predetermined sequential order for causing an explosive depth charge to be released as the last one of said relays operates.

8. In a system of the character disclosed for detecting a submarine, means for setting up an alternating magnetic field about an attacking vessel, a first search coil arranged on the vessel, a second search coil arranged parallel to said first coil and opposedly connected thereto, said first and second coils being linked by and responsive to said alternating magnetic field and adapted to generate signals in accordance with the degree of distortion of said alternating field as the vessel moves into the vicinity of a hidden submarine, means including an electro-responsive device having a movable element adapted to be set to different positions in accordance with the signals received from said first and second search coils, a plurality of control relays, means controlled by said movable element for operating said control relays in a predetermined sequence in response to a predetermined movement of the element as the vessel moves to a position above the detected submarine, and means controlled by said control relays during operation in said predetermined sequence for causing an explosive depth charge to be released above said submarine as the last one of said relays operates.

9. In a system of the character disclosed for detecting a submarine from a moving vessel, means for generating an alternating magnetic field about said vessel, a pair of coil devices arranged on the vessel in predetermined spaced relation for sensing a distortion of said alternating magnetic field caused by a submarine disposed within the path of travel of the vessel, an electro-responsive device operatively connected to said coil devices, a movable element within said electro-responsive device having a null position and a moved position and adapted to be actuated in either direction from said null position in accordance with the distortion of said alternating magnetic field sensed by said coil devices, and means controlled by said movable element for releasing an explosive depth charge when the movable element has been actuated to said moved position and thereafter to said null position in response to the distortion of said alternating magnetic field sensed by said coil devices.

10. In a system of the character disclosed for detecting a submarine from a moving vessel, means for generating an alternating magnetic field about said vessel, means including a plurality of signal generating coil devices linked by said alternating magnetic field and arranged on the vessel in predetermined spaced relation for sensing a disturbance of said alternating magnetic field caused by a submarine disposed within the path of travel of the vessel, an electro-responsive recording device operatively connected to said coil devices and having a movable element adapted to be actuated to different positions in response to the signals generated by the coil devices in accordance with the degree of disturbance of said alternating magnetic field sensed by said coil devices, said sensing means also including means for preventing actuation of said element in an undistorted condition of said field without changing the linkage of said coil devices therewith, said preventing means being effective to reduce to zero the signal generated by the coil devices when the field is in said undistorted condition, and means controlled by said movable element for releasing an explosive depth charge when the coil devices have been moved to a predetermined position with respect to said submarine.

11. In a system of the character disclosed for detecting a submarine from an aircraft in flight, means for generating an alternating magnetic field about said aircraft, a pair of search coils linked by said alternating magnetic field and arranged in predetermined spaced relation on said aircraft and adapted to generate signal indications in accordance with the degree of distortion of said alternating magnetic field as the submarine is traversed by said alternating field, means for balancing fractional portions of the signal indications generated by linkage of said coils with said field in an undistorted condition thereof, and means including an electro-responsive device operatively connected to said search coils and responsive to the unbalance of said signal indication portions for releasing an explosive depth charge as the aircraft passes over the submarine.

12. In a system of the character disclosed for detecting a submarine from an aircraft in flight, means for generating an alternating magnetic field about said aircraft, a pair of oppositely connected search coils linked by said alternating magnetic field and arranged in predetermined spaced relation on said aircraft and adapted to generate variable signal indications of predetermined polarity in accordance with differences in the instantaneous intensity of the magnetic field linked by each of the coils as the field is distorted during the approach of the aircraft to the submarine and variable signal indications of opposite polarity as the aircraft passes beyond the submarine, means for reducing to zero signal indications generated by linkage of said coils with said field in an undistorted condition thereof, and means including an electro-responsive device operatively connected to said search coils and responsive to the distortion of said alternating magnetic field for releasing an explosive depth charge as the polarity of said signal indications is reversed during the passage of the aircraft over the submarine.

13. In a system for locating a hidden submarine from a vessel while in motion, means for generating a continually varying magnetic field about said vessel, a pair of degaussing coils arranged within said varying magnetic field in predetermined spaced relation on said vessel and adapted to generate signals in accordance with the difference in the number of flux linkages of the coils with said varying field as the field is distorted by movement of the vessel within the vicinity of the submarine, means for balancing fractional portions of the signals generated by linkage of said coils with said field in an undistorted condition thereof, an electro-responsive device controlled by the degree of unbalance of said signal portions and having a pivoted element adapted to be moved to different positions including an initial position and a predetermined moved position, a first relay adapted to be operated as the movable element is moved from said initial position into said predetermined moved position, a second relay controlled by said first relay and adapted to be operated as the movable element is moved from said predetermined moved position to said initial position, and means responsive to the operation of said second relay for releasing an explosive depth charge as the vessel passes over the submarine.

14. In a mechanism for detecting a submarine, the combination of a vessel having means for generating a continually alternating magnetic field about the vessel, a pair of degaussing coils arranged in spaced relation within said alternating magnetic field and adapted to generate variable signals in accordance with the degree of distortion of said alternating magnetic field as the vessel moves within the vicinity of the submarine, a pair of resistance elements, means operable at will for connecting said degaussing coils to said resistance elements, means for selecting fractional portions of said resistance elements corresponding to balanced fractional portions of signals generated by linkage of said degaussing coils with said field in an undistorted condition thereof, and means in operative connection with each of said resistance element portions and responsive to the degree of unbalance of said signal portions for recording the degree of distortion of said alternating magnetic field.

15. A submarine detecting mechanism comprising a plurality of degaussing coils arranged in predetermined spaced relation on a vessel, means including a source of alternating current operatively connected to one of said coils for setting up an alternating magnetic field about the vessel, a plurality of resistance elements respectively connected to each of the others of said coils and having means settable at will for equalizing predetermined portions of the signals generated by said others of the coils in response to the flux linkages of the coils with said alternating magnetic field when no permeable body other than the vessel is disposed within the alternating field, means for opposedly connecting said others of the coils, and means operatively connected to said signal equalizing means and responsive to the degree of inequality of said signal portions generated by the opposedly connected coils for recording the degree of distortion of said alternating magnetic field during the passage of the vessel over the submarine.

16. In a system of the character disclosed for automatically releasing an explosive depth charge above a submarine from an attacking vessel in motion, means for setting up an alternating magnetic field about said vessel, a pair of search coils arranged in spaced relation on said vessel and adapted to generate signals in accordance with the number of flux linkages of the coils with the alternating magnetic field, means including a plurality of resistance devices connected to each of said search coils respectively, each of the devices having an element settable at will for equalizing predetermined signal portions generated by the search coils when no permeable body other than the vessel is disposed within said alternating field, an electro-responsive device in electrical connection with said resistance devices and having an element adapted to be actuated variably to a plurality of different settings in response to the degree of inequality in the signal portions received from said search coils as said alternating magnetic field is distorted by movement of the vessel within the vicinity of the submarine, and means controlled by said electro-responsive device for releasing a depth charge when said element has been actuated in a predetermined sequential order to said plurality of different settings.

17. In a system of the character disclosed for automatically releasing an explosive depth charge above a submarine from a moving vessel, means including a coil of wire disposed about the vessel for setting up an alternating magnetic field, a pair of detecting coils linked by said alternating magnetic field and arranged in spaced relation on said vessel and adapted to generate signals in accordance with the difference in the intensity of said alternating magnetic field within each of the coils respectively, an electro-responsive device operatively connected to said detecting coils and actuatable variably by said signals in accordance with the degree of distortion of said alternating magnetic field detected by said coils as the submarine is caused to be enclosed within said alternating magnetic field by the movement of said vessel, means for preventing actuation of said electro-responsive device by signals generated by linkage of said detecting coils with said field in an undistorted condition thereof, said preventing means being effective to reduce said last named signals to zero, means controlled by said electro-responsive device for closing a release circuit when a predetermined distortion of said alternating magnetic field is detected by the detecting coils, a plurality of release devices disposed at different portions of said vessel for releasably supporting a plurality of explosive depth charges respectively, and means settable at will for causing a predetermined depth charge to be released by a selected release device in response to the closure of said release circuit.

18. In a system of the character disclosed for detecting a hidden submarine disposed adjacent the path of travel of a vessel, means for generating an alternating magnetic field about said vessel, gradient means including a pair of signal generating search coils arranged upon said vessel in predetermined spaced relation and adapted to detect a distortion in said alternating magnetic field as the vessel moves within the vicinity of the submarine, means for reducing to zero a signal generated by said search coils when said field is in an undistorted condition, a plurality of photo-electric devices selectively controlled by the signals generated by said search coils in accordance with the degree of distortion of said alternating magnetic field detected by said search coils, means including a plurality of relays in operative connection with said photo-electric devices for closing a release circuit when the vessel is in a predetermined position with respect to said submarine, a plurality of release devices for releasably supporting a plurality of depth charges respectively and adapted to be selectively operated by said release circuit, means settable at will for selecting a particular release device for operation, and means effective as said release circuit is closed for causing a particular depth charge to be released by the selected release device.

19. In a system of the class disclosed for detecting a submarine, means disposed on an attacking vessel for generating an alternating magnetic field thereabout of a character adapted to be distorted variably as a submarine moves with respect to the vessel, a moveable control element, means controlled by the degree of distortion of said magnetic field for causing said element to move to different positions corresponding to different relative positions of the vessel and the submarine, a pair of control relays adapted to be operated in a predetermined sequential order in response to a predetermined movement of the element as the vessel moves to a position above the submarine, and means controlled by said pair of relays during operation thereof in said predetermined sequential order for causing an explosive depth charge to be released as the last one of said pair of relays operates.

ELLIS A. JOHNSON.

REFERENCES CITED

The following references are of record in the file of this patent:

UNITED STATES PATENTS

| Number | Name | Date |
|---|---|---|
| 1,345,276 | Stoddard | June 29, 1920 |
| 1,676,847 | Zuschlag | July 10, 1928 |
| 1,812,392 | Zuschlag | June 30, 1931 |
| 1,957,477 | Sharp et al. | May 8, 1934 |
| 2,011,441 | Drake | Aug. 13, 1935 |
| 2,027,349 | Procofieff-Seversky | Jan. 7, 1936 |
| 2,125,983 | Bettison | Aug. 9, 1938 |
| 2,206,777 | Kee | July 2, 1940 |
| 2,220,881 | Barnes et al. | Nov. 12, 1940 |

FOREIGN PATENTS

| Number | Country | Date |
|---|---|---|
| 130,050 | Great Britain | July 31, 1919 |
| 130,350 | Great Britain | 1919 or 1920 |

OTHER REFERENCES

"Electrical Experimenter," February 1918, page 664.